United States Patent [19]
Gell, Jr.

[11] Patent Number: 5,943,790
[45] Date of Patent: Aug. 31, 1999

[54] COFFEE ROASTER CHAFF COLLECTOR AND SMOKE ELIMINATOR

[76] Inventor: Harold A Gell, Jr., 13720 Lockdale Rd., Silver Spring, Md. 20906-2117

[21] Appl. No.: 09/030,278

[22] Filed: Feb. 25, 1998

[51] Int. Cl.⁶ .................................................... F26B 11/02
[52] U.S. Cl. .............................. 34/606; 34/360; 34/487; 34/494; 426/466; 99/474; 99/493
[58] Field of Search .............................. 34/360, 364, 394, 34/494, 549, 564, 576, 594, 606; 99/285, 286, 476, 483; 219/400, 502; 426/466, 467

[56] References Cited

U.S. PATENT DOCUMENTS 2,212,120  8/1940  Kneale et al. .
2,857,683  10/1958  Schytil .
2,859,116  11/1958  Heimbs et al. .
3,122,439  2/1964  MacAllister et al. .
3,149,976  9/1964  Smith, Jr. .
3,189,460  6/1965  Smith, Jr. .
3,328,172  6/1967  Smith, Jr. .
3,329,506  7/1967  Smith, Jr. .
3,345,180  10/1967  Smith, Jr. .
3,345,181  10/1967  Smith, Jr. .
3,615,668  10/1971  Smith, Jr. .
3,730,731  5/1973  Smith, Jr. .
3,964,175  6/1976  Sivetz .
4,484,064  11/1984  Murray .
4,494,314  1/1985  Gell, Jr. .
4,602,147  7/1986  Gell .
5,269,072  12/1993  Waligorski .
5,359,788  11/1994  Gell, Jr. .
5,496,389  3/1996  Wilcox ..................................... 55/473

FOREIGN PATENT DOCUMENTS 573649  11/1984  Australia .
1227688  10/1987  Canada .
0143646  11/1984  European Pat. Off. .

Primary Examiner—Henry Bennett
Assistant Examiner—Pamela A. Wilson
Attorney, Agent, or Firm—Harold Gell, P.C.; Harold Gell

[57] ABSTRACT

An exhaust particle and particulate containment system for a coffee roaster includes an exhaust duct for carrying exhaust coffee roasting by-products including air, gasses, smoke and chaff from the coffee roaster to a porous medium for separating chaff from the exhaust coffee roasting by-product flow and a filter for removing smoke particles from the exhaust coffee roasting by-product flow which passes through the porous medium.

20 Claims, 4 Drawing Sheets

COFFEE ROASTER CHAFF COLLECTOR AND SMOKE ELIMINATOR

FIELD OF THE INVENTION

This invention relates to a means and apparatus for separating chaff, eliminating smoke and venting waste gases generated during a coffee roasting process.

BACKGROUND OF THE INVENTION

Coffee, a beverage brewed from ground, roasted beans of the botanical species coffee originated in a part of the world now known as Ethiopia where wild Arabica trees were harvested to obtain the bean concealing cherries. The use of coffee as a beverage gradually spread from Ethiopia to include all of what was considered the civilized world by the early 17th century. Its popularity spread throughout the world in unison with mans advancement in global navigation. By the early 18th century the demand for coffee outstripped the ability of the native Arabica trees and plantations sprung up around the world in every country having a climate hospitable to the Arabica tree. Today, a coffee belt girdling the globe provides a great variety of cafes having regional qualities which attempt to meet the varied taste of the world population.

The characteristic flavor of coffee is affected not only by the point of origin and quality of the bean but also by the processing and roasting of the coffee bean. This provides an infinite variety of flavor characteristics which are further expanded by blending various varietal cafes and by brewing techniques.

The infinite variety afforded by coffee as a beverage is unfortunately a potential which has not been tapped except in a minimal way due to problems in marketing. The flavor of coffee is developed by roasting which causes the chemical reaction of pyrolysis within the beans that develops the coffee oils which create the essence and flavor of coffee. At the present time there is no easy, repeatable way to roast coffee in the home, therefore coffee is purchased preroasted and generally preground. This eliminates the possibility of individuals adjusting the coffee to suit their tastes in that they must be satisfied with products provided by commercial coffee roasters.

The fact that most coffee is sold preground or at least preroasted is an unfortunate circumstance. Coffee begins losing its flavor as soon as it is roasted. Ground coffee loses a significant amount of flavor within hours of being ground while roast coffee stored as whole beans will maintain its flavor reasonably well for approximately one week if sealed in an air tight container to minimize oxidation of the oils. Thus the coffee industry has what appears to be an unlimited variety of flavors that it can offer the public but due to marketing logistics, only a small segment of the potential may be tapped. Conversely, green coffee may be kept for years with little effect on its flavor content other than a mellowing such as is found in the aging of a fine wine.

Ideally then, the coffee industry should market its product as green coffee beans so that the individual consumer may blend and roast beans to meet his desires. Unfortunately, no satisfactory roasting device is available for the individual consumer whereby a small quantity of coffee for a single serving or single pot may be roasted.

A few coffee devotees manage to roast beans in iron skillets but this is a difficult task in that the skillet must be heated to a predetermined temperature and the beans introduced into the heated skillet which must be covered to maintain heat. The beans are agitated to ensure that they do not burn and when they have reached the proper degree of pyrolysis, the roasting must be quenched by dumping the beans onto a cool surface. At best, this method results in a product wherein the individual beans are each roasted to a different degree of roast, ranging anywhere from a light cinnamon roast to a heavy roast in a single batch.

Some improvements have been made to the pan roasting methods wherein a stirring device is fitted in the pan cover so that a person may continually stir the coffee in the pan while the cover is tightly maintained to ensure that the heat remains within the pan. This results in beans of a more uniform roast but the end product is still far from acceptable.

Pan roasting techniques for home use have a further disadvantage. In addition to the inconsistent degree of roasting achieved, the chaff coating of the coffee beans is loosened but not separated from the beans. Therefore, this undesirable part of the coffee bean remains with the beans and can only be separated by a winnowing technique. Furthermore the chaff tends to burn during the pan roasting process and results in a considerable amount of pungent smoke.

One attempt has been made to improve home roasting methods through the use of modern technology. This device is comprised of a hand-held hair dryer like device with a metal funnel over the hot air exhaust. The green beans are placed in the funnel and as the heated air passes through the beans, the operator gently tosses the beans within the funnel by up and down movement of the device. This particular home roaster is impractical for more than an ounce of beans at a time and the operator must continually shake the device which becomes very fatiguing. Also, the chaff associated with the beans is blown around the kitchen or area where the roasting is accomplished.

The early hand-held hair dryer type hot air coffee roasters were improved by devices such as J. Murray's coffee roaster patent, U.S. Pat. No. 4,484,064 and M. Sivetz's coffee roasting system, U.S. Pat. No. 3,964,175. Both of the foregoing devices levitated a charge of green coffee beans in a heated air stream. They relied on an oven chamber which grew progressively larger from the bottom to the top so that the velocity of heated air diminished as the volume increased with the expansion of the dimensions of the oven chamber. This results in a fluidized bed where the beans are levitated by the high velocity air and carried upward but as the velocity to the air stream diminishes, the beans are allowed to fall back. Creating a fluidized bed in this fashion requires high air flow rates and as a result the system is extremely inefficient. In fact, roasters of this type require an excessively long roasting time due to the cooling effect of the upwelling heated air as it expands into the increased diameter upper oven chamber. The end result of this deficiency of the design is that the beans are dried and become stale in the roasting process.

The shortcomings of the prior coffee roasting systems utilizing a fluidized bed created by a flared chamber have been eliminated by the use of a horizontally rotating fluidized bed as described in U.S. Pat. No. 4,494,314 for "Coffee Roaster" and U.S. Pat. No. 5,359,788 for "Coffee Roaster" issued to Harold Gell on Jan. 22, 1985. With the advent of horizontally rotating fluidized bed applications to coffee roaster technology, the problems involving the actual roasting technique have been solved. However, a problems remain with respect to collection of the chaff and elimination of gasses and smoke generated during the roasting process.

OBJECTIVES OF THE INVENTION

In view of the obvious inability of prior techniques to tap the full potential of flavors available in the various cafes produced throughout the world by providing a relatively easy method of home roasting, it is a primary objective of the present invention to provide a device with which an individual consumer may roast a small amount of coffee to a predetermined degree of pyrolysis, cellulose carbonization and caramelization without creating offensive smoke.

To avoid the shortcomings in the prior art coffee roasters, it is a primary objective of this invention to provide a chaff trap which also serves as a flexible, expansible exhaust duct for waste gasses and smoke generated during the roasting process.

It is a further objective of the present invention to provide a chaff trap and smoke eliminating exhaust duct that may be removed and replaced from the top of a coffee roaster oven chamber.

A further objective of the invention is to provide a removable chaff trapping means in the exhaust end of the exhaust duct of a coffee roaster.

A still further objective of the present invention is to provide a removable and replaceable exhaust duct that may be extended and bent in any desired shape to provide a conduit to the out side or into a filter means for gasses and smoke generated during pyrolysis.

A further objective of the present invention is to provide a home coffee roasting device which removes chaff from coffee beans and traps the chaff on a collector to prevent chaff contamination of the environment.

A still further objective is to provide an exhaust particle and particulate trap for a fluidized bed coffee roaster.

The foregoing and other objectives of the invention will become apparent in light of the drawings, specification and claims contained herein.

SUMMARY OF THE INVENTION

A combined chaff trap, smoke eliminator and exhaust duct for a coffee roaster is presented in the form of an exhaust particle and particulate trap. The coffee roasting method and apparatus used in preferred embodiments of the invention are similar to those systems described in U.S. Pat. Nos. 4,494,314; 5,359,788; and 5,500,237 which are incorporated herein by reference.

The essence of the invention is an exhaust duct terminated by a porous surface for collecting large particulate matter such as chaff and channeling the remaining effluent through an air filter which separates smoke particles from the exhaust gases. In one embodiment the exhaust duct is fabricated from metal or other high temperature tolerant material into a tubular duct dimensioned at on end to fit over the open top of a coffee roaster oven in a manner which allows easy coupling and removal and provides a fit which will not allow chaff or smoke to escape from between the duct and the oven. The fabrication technique is a function of the material selected and designed to allow flexibility as well as extensibility so that the duct may be curved down to provide a containment means for chaff when the free end is fitted with a suitable gas/chaff separating means or extended and directed out of a building opening to exhaust gasses and smoke out side or into a filter system capable of trapping smoke particles.

In another embodiment the duct is a ridged tube rising from the oven chamber of a coffee roaster. The duct is positioned inside a large diameter tubular housing which is sealed at the top and has a gas impermeable upper exterior side wall section and a gas permeable lower wall section. A screen closes the space between the bottom of gas impermeable wall of the housing and the exterior wall of the duct, connecting to the duct at a position which leaves a section of the duct above the screen, thereby forming a screened bottom receptacle for chaff. The top of this receptacle is sealed by the removable top of the housing which is positioned to form a space over the duct through which the exhaust products of the coffee roasting process flow over the top side of the duct and down through the screen. A deflector may be included to enhance air flow. The bottom of the housing is connected to a lower portion of the duct to form a chamber which contains an air filter capable of trapping smoke particles.

The chaff trap in either embodiment is comprised of a section of the duct and a gas/chaff separator fabricated from a material such as a 30×30 stainless steel screen wire cloth.

Smoke elimination is provided by a filter fabricated from a material which is not affected by the high temperature of the exhaust gasses. A high-efficiency, particulate, air filter (HEPA) is preferred. The filter has a surface area large enough so as not to impede air flow through the system to such an extent that the fluidized bed is markedly affected or terminated.

DESCRIPTION OF THE INVENTION

Figure 1:
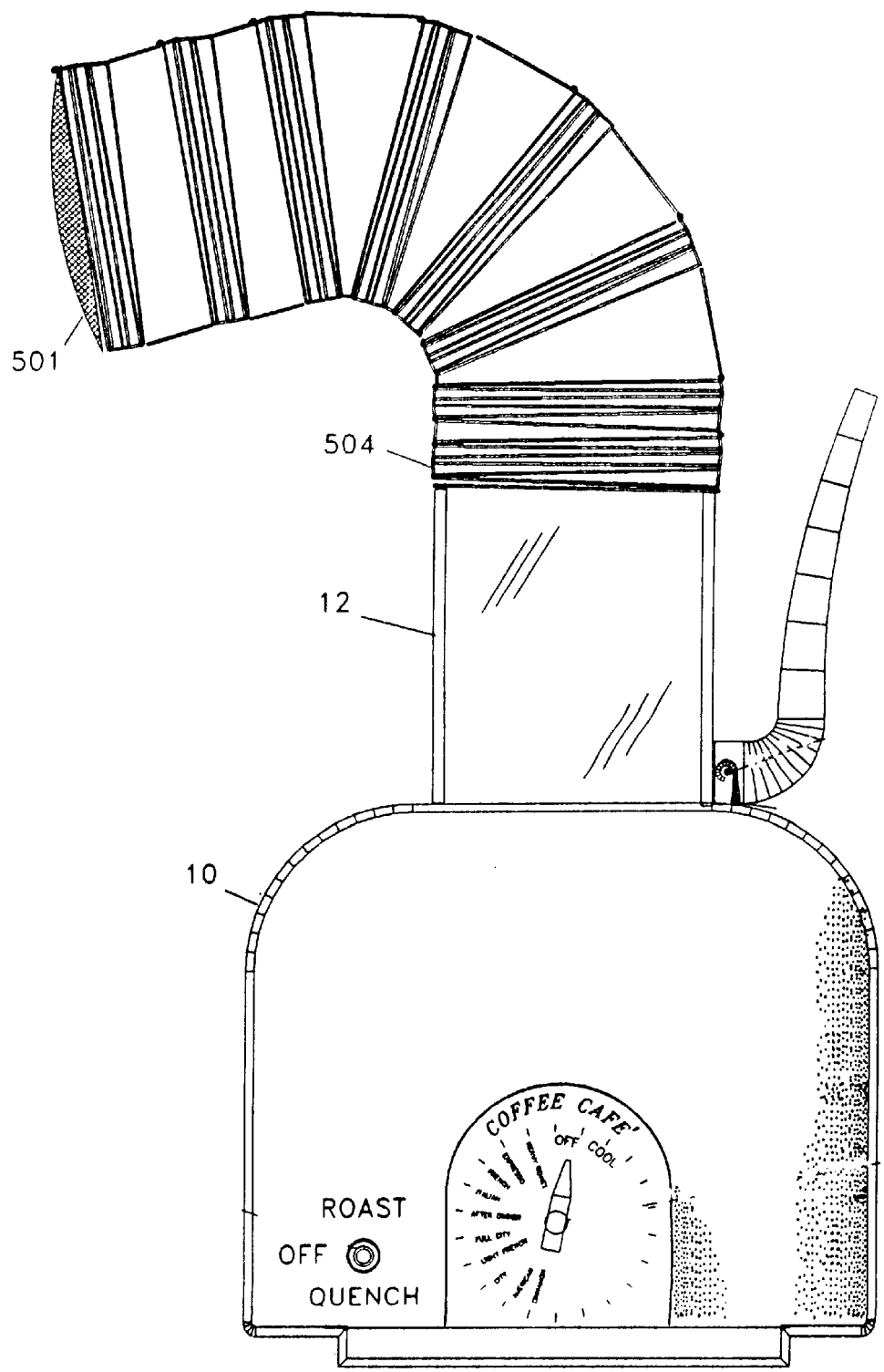
FIG. 1 is a front view illustrating the removable chaff trap and exhaust duct in operative position on top of the oven chamber of a coffee roaster.

FIG. 1 is a front view of a preferred embodiment of the coffee roaster. It is comprised of a roaster housing 10 which contains the two-part oven chamber recessed within the roaster housing and a transparent cylinder or chimney 12 which rests on top of the drum and is held in place by the portion of the roaster housing which extends above the drum. The oven is charged with coffee beans through the top of the cylinder 12. A chaff trap comprising and exhaust waste product duct 504 fits over the top of the cylinder 12 and functions as a cover for the open top of the transparent upper section of the oven chamber. The chaff trap is removed when the oven is being charged with coffee beans and when roasted beans are removed.

Figure 3:
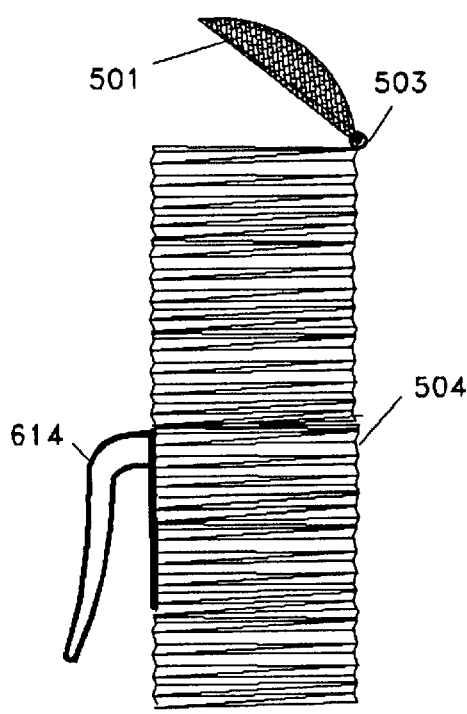
FIG. 3 is a side view of a chaff trap and exhaust duct in its compressed and unshaped form with the chaff collection screen partially open.

The flexible, extensible duct, 504, of the chaff trap also serves as an exhaust duct for other waste products of coffee roasting. It is preferably made of a light weight metal such as aluminium which is rolled and pleated in the manner of basic flexible metal duct stock which is commercially available and sold as cloths dryer ducting. FIG. 3 illustrates the duct 504 as it appears when it is compressed for storage. The upper end is the end opposite the end that is dimensioned to slip over the upper section 12 of the roaster. It is provided with a gas/chaff separator or filter 501 which may be a perforated sheet that may be flat or shaped but is preferably a metal screen of approximately 30×30 gauge. In the preferred embodiment SST304 30×30 stainless steel wire cloth is used to provide a screen with a mesh small enough to stop and collect practically all of the chaff particles but allow a free passage for exhaust gases and smoke to preclude stalling the fluidized bead of coffee beans. If the rotation of the fluidized bed stalls, stops, it can result in an uneven roast, overheating of the roasting engine and/or failure of the systems thermal safety cut out. The screen 501 may be rigidly secured over the end of the duct 504 or inserted into the duct. In one embodiment it is secured by a hinge means 503 which allows it to be raised for cleaning and thereby allowing for the use of a curved, ridged tube in place of the flexible duct. A handle 614 is provided for moving the duct while it is hot.

Figure 2:
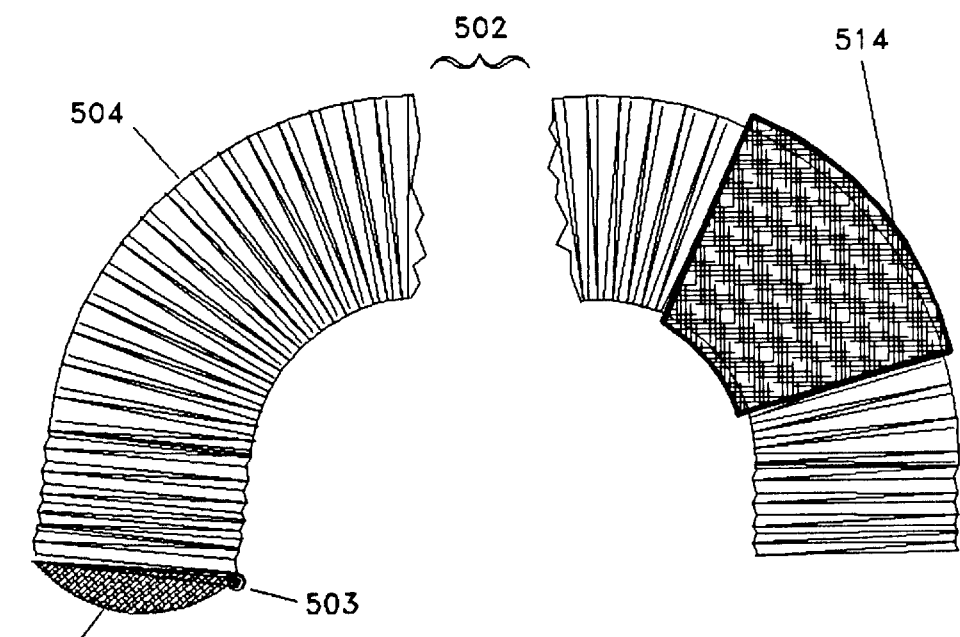
FIG. 2 is a side view of a chaff trap and exhaust duct curved into a chaff collecting shape and indicating the extensibility of the duct.

FIG. 2 illustrates the duct 504 curved to trap chaff and prevent it from falling back into the oven. In this illustration section 502 symbolizes the concept of stretching the duct 504 as well as bending it so that it may be used to direct the exhaust of the coffee roaster through an opening and out of a building, into an air filter system or tilted up to exhaust into a standard cooking range top ventilating hood.

Insulating means are provided to allow a user to handle the duct while it is hot. The insulating means may be a pad or coating 514 on the duct as illustrated in FIG. 2 but in the alternate embodiment of FIG. 3, a handle 614 is provided to eliminate the necessity of the pad or coating. This results in increased thermal radiation, producing a cooler duct which reduces the temperature of the gas and smoke to minimize heat damage to any filter unit that may be attached to the end of the duct such as the filter 600 of FIG. 6.

The preferred filter media in all embodiments meets the requirements of Underwrites Laboratories Inc.R standard 586 for High-Efficiency, Particulate, Air Filter Units. This standard requires survivability at air flow temperatures of 700° F. and a DOP efficiency of 97.5% to stop particles as small as 3 microns. Such filters are referred to herein as HEPA filters. A less efficient filter media may be used with adequate success in most home environments. For instance, it has been demonstrated that a filter medium with a DOP efficiency of 95% prevents activation of home smoke alarms even when heavy dark roasts are preformed in the coffee roaster. Even less efficient filter mediums have been used with acceptable smoke reduction results but what ever the efficiency, it is desirable from a safety standpoint that the filter media meet the heat flow requirements of Underwrites Laboratories Inc.[R] standard 586 for High-Efficiency, Particulate, Air Filter Units or standard 900 for Air Filter Units which has a higher air flow temperature requirement than 586 but no efficiency requirement applicable to the present invention.

Figure 5:
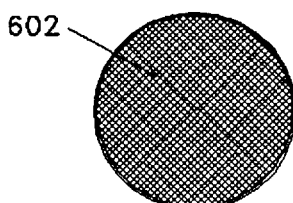
FIG. 5 is a bottom view of the removable chaff trap cup illustrating the chaff separating screen.

In FIG. 1, the duct 504 is curved but not greatly extended in a fashion which causes it to function as a chaff trap using a hinged screen as illustrated in greater detail in FIGS. 2 and 3. In an alternate embodiment the hinged screen 501 is replaced by a removable chaff trap cup 601 illustrated in FIGS. 4 and 5. The chaff trap cup, 601, is a cylinder open at the top, 609, and closed at the bottom, 608, by a metal mesh screen 602 best seen in the bottom view of the device shown in FIG. 5. A 30×30 stainless steel screen is preferred. The top of the cylinder is slightly tapered to allow it to slid easily into the duct 504 as demonstrated in FIG. 6, and then become wedged therein to form a seal which prevents chaff or smoke from escaping. The chaff trap 601 is emptied by pulling it free of the duct 504 which in this embodiment may be a ridged tube.

Figure 4:
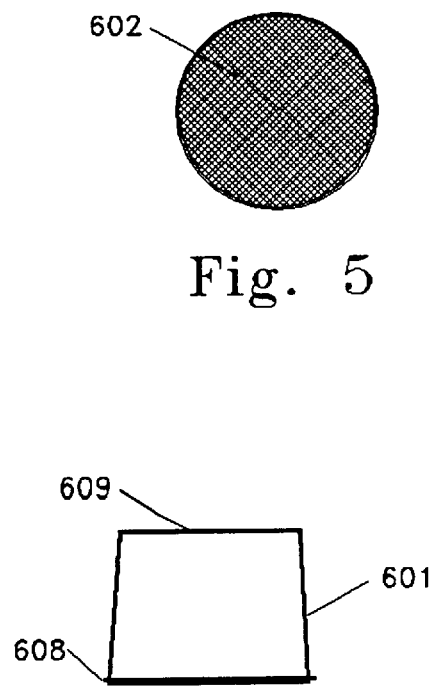
FIG. 4 is a side view of the removable chaff trap cup.
Figure 6:
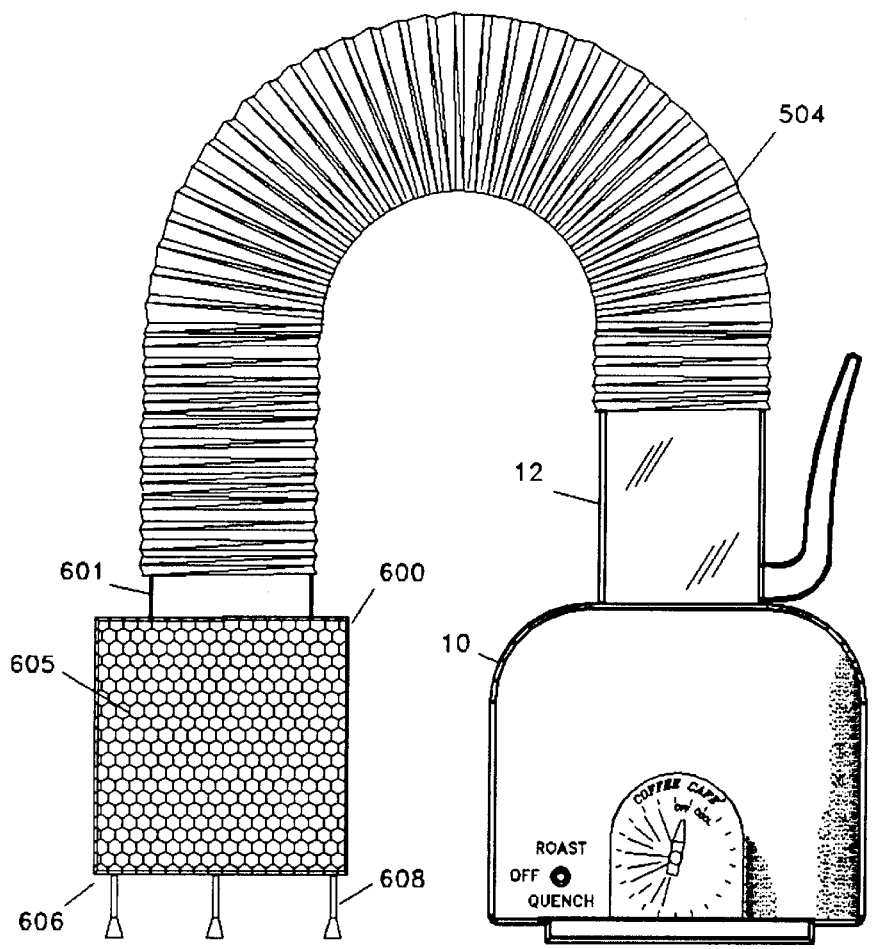
FIG. 6 is a front view of a smoke eliminating embodiment of the coffee roaster illustrating the removable chaff trap, smoke eliminating filter and exhaust duct in operative position on top of the oven chamber of a coffee roaster.

The chaff trap cup or chaff collector 601 slides into the exhaust end of the duct 504 as illustrated by FIG. 6. This is facilitated by the slight taper of the cup toward the top, 609, which is slightly smaller than the base. The tapered configuration allows the cup to easily slide into the duct and become wedged therein. The bottom of the chaff trap cup, 608, is provided with a bead as best seen in FIG. 4 which is dimensioned to fit into and securely lock within the locking ring, 611 of FIG. 7, forming the opening 610 centered in the top 607 of the smoke eliminating filter 600.

The smoke elimination filter and chaff trap assembly illustrated in operative position in FIG. 6 is provided with a plurality of legs 608 fastened to the solid bottom 606 of the smoke eliminating filter unit 600 so that the weight of the unit may be borne by the counter or table top supporting the roaster rather than by the chimney of the coffee roaster. The legs prevent the bottom of the filter unit from contacting the counter top, avoiding scorching that surface during the roasting process when the filter unit reaches its maximum temperature.

Figure 8:
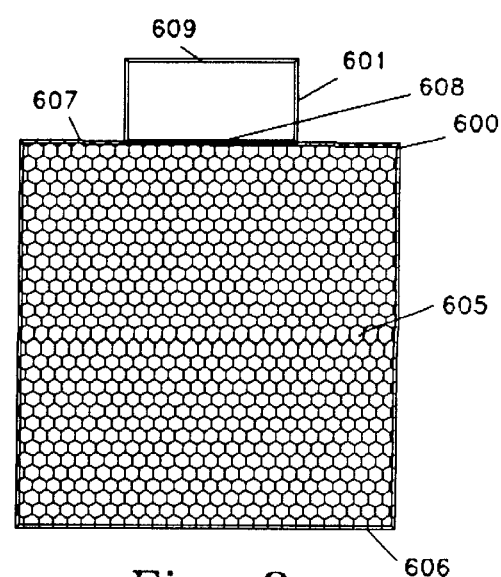
FIG. 8 is a side view of the smoke elimination filter unit and chaff trap assembly.

FIG. 8 illustrates the smoke elimination filter 600 with the chaff trap 601 installed. The chaff trap 601 and smoke elimination filter 600 are separable to allow replacement of the filter unit which will become clogged after extensive use. The chaff trap may be cleaned and reused for a considerably longer period of time than the filter.

Figure 7:
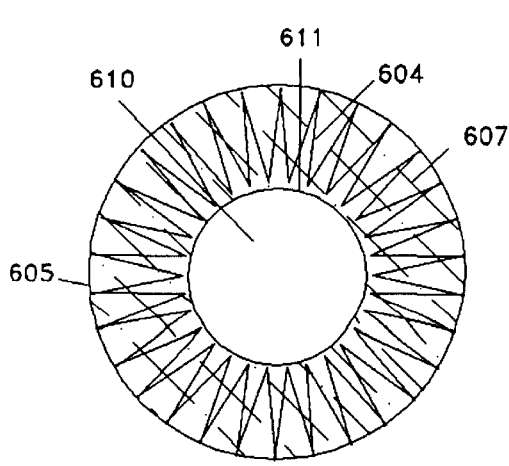
FIG. 7 is a top cut-away view of the smoke elimination filter unit illustrating the pleated filter element and chaff trap receiving opening.

As illustrated in FIGS. 6 and 8, the smoke elimination filter housing includes a solid top 607, which includes an opening 610 therein to receive the bottom 608 of the chaff trap 601, and a solid bottom 606. The top 607 and bottom 608 are joined by a cylinder of perforated metal or metal mesh 605. As can be seen in FIG. 7, the exterior metal mesh 605 encompasses the high efficiency particle air filter (HEPA) material 604. The HEPA filter material is pleated in accordion fashion and arranged around the central opening 610 in the filter housing, see FIG. 7. The top and bottom of the filter media engage the top and bottom of the filter housing to ensure that smoke entering through the opening 610, after passing through the chaff collector 601, will be contained within the filter unit such that its only avenue of escape is through the filter medium 604. The central opening 610 into the filter unit is provided with a locking ring 611 which engages the bottom 608 of the chaff trap and holds that unit securely therein to ensure that all of the smoke and waste gas products enter the center 610 of the filter unit In an alternate embodiment the locking ring is replaced by a gas tight seal and the chaff collector 601 is held in place by a clamping means, cam surfaces or screw threads.

The media used for smoke filtration, 604, is selected from materials that are not subject to deterioration or shrinkage caused by the excessive heat of the exhaust gasses of the coffee roaster which can exceed 300° F. Any filter media meeting the basic temperature requirements of withstanding operating temperature in excess of 300° F. may be used, provided the media removes enough smoke from the exhaust gasses to preclude setting of a residential smoke alarm by operation of the coffee roaster.

Figure 9:
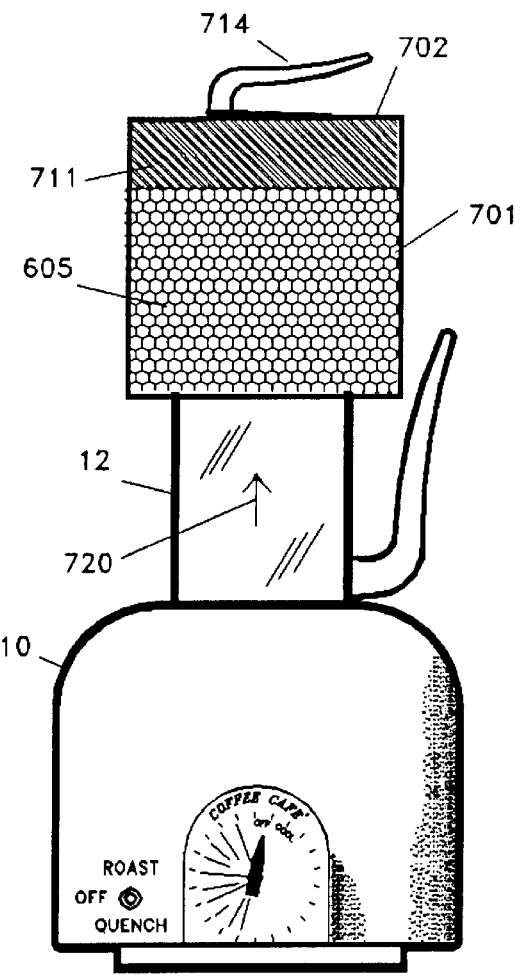
FIG. 9 is a front view of a preferred smoke eliminating, chaff trap embodiment installed in operative position on top of a coffee roaster.

FIG. 9 is a front view of a coffee roaster with the preferred embodiment of the exhaust particle and particulate containment system of the present invention installed in an operative position on top of the exhaust chimney 12 of a coffee roaster 10. It functions as a smoke eliminating chaff collection unit which has an open top closed by a cover 702. The cover is be secured by latches or any conventional means, including a snap ring and groove. The cover includes a handle, 714, to permit removal of the unit while it is at an elevated temperature. The exterior wall 701 of the smoke eliminating chaff collector is comprised of an upper circular band 711 fabricated from metal such as aluminum or steel and a lower section 605 fabricated from perforated metal or mesh material to create a cylindrical housing including a gas impervious upper section 711 and a gas permeable lower section 605. The exterior wall includes a gas impervious upper section which extends above the outlet end of the duct and a porous lower section.

Figure 10:
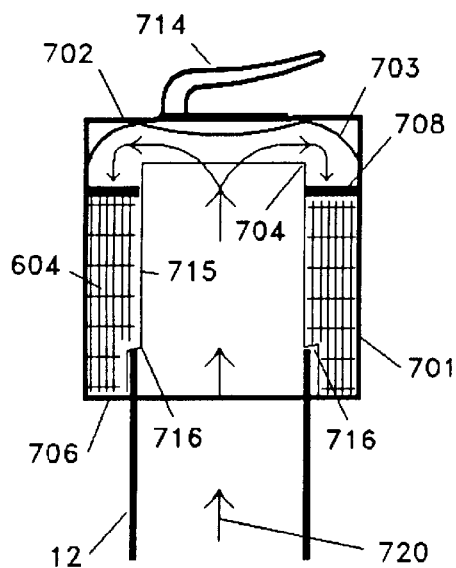
FIG. 10 is a sectional view illustrating the internal components of the embodiment of FIG. 9.

The details of the exhaust particle and particulate containment system may best be seen in FIG. 10 which illustrates how the chaff collector 708 and smoke eliminator 604 are created around the central duct 704 which is an exhaust duct for carrying exhaust coffee roasting by-products including air, gasses and chaff from the coffee roaster oven chimney. The duct has an upper section 715 with an interior dimension slightly smaller than the diameter of the oven chimney 12 of the coffee roaster and lower section which is slightly greater in diameter to receive the top of the chimney 12 and provide a supporting flange 716 for the exhaust particle and particulate containment system.

An external wall 701 comprised of an upper gas impervious section 711 and a lower gas permeable section 605 is connected to the duct 704 by a gas impervious ring 706 continuously joining the bottom of the external wall to the bottom of the duct, forming a chamber comprising the wall and an exterior surface of the duct. The height of the duct 704, impermeable wall section 711 and permeable wall section 605 are selected so that the impermeable section begins below the outlet end of the duct and extends above the duct to form an upper chamber with impervious side walls and a flow deflector 703 forming a channel through which exhaust coffee roasting by-products may flow over the top of the duct and down between the outer wall of the duct and the external wall 701. A porous medium such as a screen 708 is arranged and dimensioned to form a bottom for the upper chamber and dived the space between the external wall 701 and duct 704 into upper and lower chambers. The upper chamber is the chaff trap which is emptied by removing the cover 702 and deflector 703 which is fastened to the cover.

The exhaust coffee roasting by-products which pass through the screen and into said lower chamber may contain smoke particles when a dark roast is in process. These particles are trapped by filter media 604 which has a porosity which will not allow passage of smoke particles created from coffee bean elements. The filter media is dimensioned and positioned in the lower chamber to cover the porous lower section 605 of the external wall and create a secondary lower chamber, the space between the duct and filter media, for dispersing the exhaust coffee roasting by-products over the surface of the filter media opposite the external, porous wall whereby the exhaust coffee roasting by-products are passed through the filter media and then through the porous lower section of said wall, 605.

Figure 12:
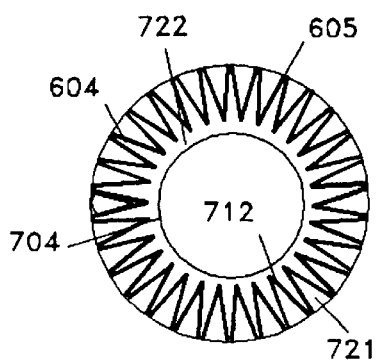
FIG. 12 is a top view of the preferred smoke eliminating, chaff collecting embodiment illustrating the smoke eliminating filter element located beneath the chaff separating screen.

In a preferred embodiment, the filter media 604 is accordion pleated as illustrated in FIG. 12 with the outer points of the accordion pleats engaging the lower outer wall 605 of the tubular housing of the smoke eliminating chaff collector 701. An accordion pleat configuration is recommended but not necessary. The reason for the accordion pleat is to maximize the surface area of the filter to reduce back pressure and prevent stalling of the rotating fluidized bed during the roasting process. The height of the filter media 604 is slightly greater than the height of the perforated metal outer tubular wall 605 so that when the filter media is installed within the filter unit housing, the top of the filter media rises above the perforated exterior wall. The inner duct 704 also rises to a height which exceeds the perforated exterior wall 605.

Figure 11:
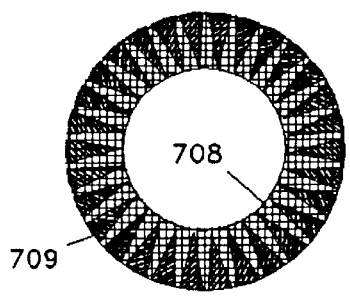
FIG. 11 is a top view of the pre-filter, chaff collecting screen of the preferred smoke eliminating, chaff collecting embodiment.

The inner duct 704, as illustrated in FIG. 10, is encircled by the chaff separating or collection screen 708 which is best seen in FIG. 11. This screen sets on top of the filter media 604. It contains a plurality of spherical triangular wedges 709 which are fabricated from a gas impermeable material and designed and dimensioned to cover and seal like shaped spaces 721 created by the accordion folds of the filter media and exterior wall of the housing. These spaces, 721, are defined by the outer face of the filter media and are located so that the curved base of each such spherical triangular area coincides with the exterior perimeter of the element, thus permitting smoke and exhaust gasses to pass only through the chaff collection screen segments 708 and into the space 722 created by the interior surface of the filter media, 712, and the exterior wall of the inner duct 704 as seen in FIG. 12. Alternately, the wedges 709 may be incorporated directly into the accordion folded filter media as segments of additional filter media or simple gas impermeable plugs. The same effect may be achieved in the more commonly encountered version of accordion pleated filters by simply sealing the accordion edges of the filter. This is a satisfactory arrangement in some cases but it reduces the effective area of the chaff collection surface. This configuration simplifies construction of the chaff collecting screen 708 by allowing it to be formed as a simple ring.

In operation, as exhaust gasses and chaff rise through the oven chimney 12, they strike the deflector, 703 of FIG. 10, which is attached to the interior of the top cover. The deflector redirects the gasses, smoke and chaff over the upper edge of the interior duct 704 and onto the chaff separating screen 708. The chaff stops here but the smoke and gasses pass through the portions of the screen mesh 708 which are not covered by the solid plates 709. Thus the smoke and gas flow into the interior space 722 of the smoke eliminating filter chamber created between the central duct 704 and interface 712 of the filter media. The exhaust gas and smoke are then forced into the filter media 604 by the pressure created by the air creating the fluidized bed in the roasting chamber. The gasses escape being through the filter media and out the perforated metal wall 605 of the filter unit, leaving most of the smoke particles in the filter media 604.

Figure 13:
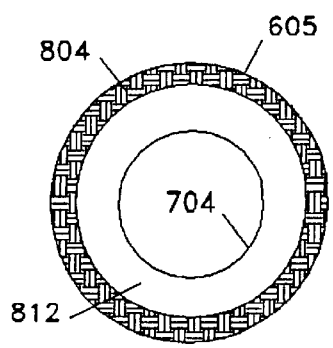
FIG. 13 is a top view of an alternate filter element for the preferred smoke eliminating, chaff collecting embodiment illustrating the smoke eliminating filter element located beneath the chaff separating screen.
Figure 14:
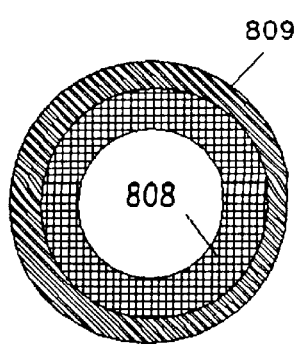
FIG. 14 is a top view of an alternate prefilter element, chaff collecting screen to be used with the filter of FIG. 13 in the preferred smoke eliminating, chaff collecting embodiment.

In an alternate embodiment, the filter media is not accordion pleated. It is a solid ring dimensioned to fit snugly within the perforated section of the housing and extend slightly above into the solid walled section 711 as described for the pleated filter media 604. In this embodiment, the chaff separating screen is comprised of a ring of screen material between the outer wall of the inner duct 704 and inner wall of the housing or a solid exterior ring 809, as best seen in FIG. 14, and an inner ring of screen mesh 808. The former configuration is used when the filter media has a sealed top edge and the later when it does not. The exhaust gasses and smoke pass through the screen mesh 808 and enter the area 812 of FIG. 13 between the filter media 804 and inner duct 704. This embodiment generally produces more back pressure than the accordion pleated filter media embodiment but either embodiment will function satisfactorily as long as a function of the filter surface area and filter media resistance has an overall air flow value above the stalling point of the fluidized bed.

Ideally, air flow through the coffee which creates the fluidized bed is at such a volume that the coffee roaster functions properly with or without the smoke eliminating chaff trap installed. However, if smoke elimination is the primary concern and filter size is to be kept at a minimum, the air pressure within the coffee roaster can be increased to overcome increased back pressure in the filter unit. If this option is selected, the coffee roaster will not function properly with the filter removed but the trade-off is insignificant considering that under all roasting operations in certain environments, the filter must be installed.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. An exhaust particulate containment system for a fluidized bed coffee roaster, comprising:
   a duct including an inlet and an outlet;
   said inlet dimensioned to mate with the exhaust opening of said coffee roaster for containing the exhaust air carrying chaff from said coffee roaster;
   a porous surface attached to said duct for collecting chaff passing through said duct; and
   a filter for removing smoke particles from the flow which passes through said porous surface.

2. An exhaust particulate containment system as defined in claim 1, wherein said duct is flexible.

3. An exhaust particulate containment system as defined in claim 2 wherein said flexible duct includes insulating means for permitting a user to grasp said flexible duct without being burned when said flexible duct is hot.

4. An exhaust particulate containment system as defined in claim 3 wherein said flexible duct is fabricated from pleated metal designed to allow expansion and bending of said flexible duct.

5. An exhaust particulate containment system as defined in claim 1 wherein said filter is fabricated from material which will withstand an operating temperature in excess of 300 degrees Fahrenheit.

6. An exhaust particulate containment system as defined in claim 1 wherein said porous surface is fabricated from wire screen cloth.

7. An exhaust particulate containment system as defined in claim 1 wherein said filter includes a high efficiency, particulate, air filter media with a survivability at air flow temperatures of 700° F. and a DOP efficiency of 97.5% to stop particles as small as 3 microns.

8. A chaff and particulate separator for a coffee roaster amended which supplies air to carry chaff away from coffee beans, comprising:
   a flexible duct including an inlet and an outlet;
   said inlet dimensioned to enclose an air exhaust opening of said coffee roaster for conveying said air carrying said chaff from said coffee roaster;
   a chaff collector at said outlet of said flexible duct; and
   a HEPA filter for separating particulate material from said air which passes through said chaff collector.

9. A chaff and particulate separator as defined in claim 8 wherein said flexible duct includes a handle.

10. A chaff and particulate separator as defined in claim 8 wherein said chaff collector is fabricated from wire screen cloth.

11. A method for containment of chaff and exhaust particulates created during coffee roasting, including the steps of:
    ducting air containing chaff and exhaust particulates into a container having an open end closed by a particle screening means;
    separating chaff from said air with said particle screening means; and
    ducting said air containing exhaust particulates and separated from said chaff from said container into a high efficiency, particulate, air filter.

12. An exhaust particle and particulate containment system for a coffee roaster, comprising:
    an exhaust duct for carrying exhaust coffee roasting by-products including air, gasses, smoke and chaff from said coffee roaster;
    a porous medium for separating chaff from said exhaust coffee roasting by-products flowing through said duct; and
    a filter for removing smoke particles from said exhaust coffee roasting by-products which pass through said porous medium.

13. An exhaust particle and particulate containment system as defined by claim 12, wherein said porous medium is a metal screen.

14. An exhaust particle and particulate containment system as defined by claim 13, wherein said filter media is a high efficiency, particulate, air filter with a survivability at air flow temperatures of 700° F. and a DOP efficiency of 97.5% to stop particles as small as 3 microns.

15. An exhaust particle and particulate containment system amended as defined by claim 12, comprising:
    a wall;
    said wall including a gas impervious upper section and a porous lower section;
    a gas impervious means connecting said wall to said duct for forming a chamber comprising said wall and an exterior surface of said duct;
    said porous medium arranged between said wall and said duct to divide said chamber into an upper chamber incorporating said gas impervious upper section of said wall and a lower chamber incorporating said lower porous section of said wall;
    said upper chamber including a bottom formed by said porous medium and a top extending above an upper portion of said duct including said outlet end;

a gas impervious cover enclosing said top of said upper chamber for creating a flow path for said exhaust coffee roasting by-products from said duct into said upper chamber, through said porous medium and into said lower chamber; and a filter media with a porosity which will not allow passage of smoke particles created from coffee bean elements dimensioned and positioned in said lower chamber to cover said porous lower section of said wall and create a secondary lower chamber for dispersing said exhaust coffee roasting by-products over a surface of said filter media opposite said wall whereby said exhaust coffee roasting by-products are exhausted through said filter media and then said porous lower section of said wall.

16. An exhaust particle and particulate containment system as defined by claim 15, wherein said filter media is a high efficiency, particulate, air filter with a survivability at air flow temperatures of at least 300° F.

17. An exhaust particle and particulate containment system as defined by claim 16, wherein said filter media is formed as an accordion pleated ring.

18. An exhaust particle and particulate containment system as defined by claim 15, wherein said porous medium is a metal screen.

19. An exhaust particle and particulate containment system as defined by claim 15, wherein said filter media is a high efficiency, particulate, air filter with a survivability at air flow temperatures of 700° F. and a DOP efficiency of 97.5% to stop particles as small as 3 microns.

20. An exhaust particle and particulate containment system as defined by claim 19, wherein said filter media is formed as an accordion pleated ring.

* * * * *

UNITED STATES PATENT AND TRADEMARK OFFICE
CERTIFICATE OF CORRECTION

PATENT NO.  : 5,943,790
DATED       : August 31, 1999
INVENTOR(S) : Harold A. Gell, Jr.

It is certified that error appears in the above-identified patent and that said Letters Patent is hereby corrected as shown below:

Claim 8 should read as follows:

Claim 8: A chaff and particulate separator for a coffee roaster which supplies air to carry chaff away from coffee beans, comprising:
a flexible duct including an inlet and an outlet; said inlet dimensioned to enclose an air exhaust opening of said coffee roaster for conveying said air carrying said chaff from said coffee roaster;
a chaff collector at said outlet of said flexible duct; and
a HEPA filter for separating particulate material from said air which passes through said chaff collector.

UNITED STATES PATENT AND TRADEMARK OFFICE
CERTIFICATE OF CORRECTION

PATENT NO : 5,943,790
DATED : August 31, 1999
INVENTOR(S): Harold A. Gell, Jr.

It is certified that error appears in the above-identified patent and that said Letters Patent is hereby corrected as shown below:

Claim 11 should read as follows:

Claim 11: A method for containment of chaff and smoke created during coffee roasting, including the steps of:
ducting air containing chaff and smoke into a container having an open end closed by a particle screening means;
separating chaff from said air with said particle screening means; and
ducting said air containing smoke and separated from said chaff from said container into a smoke eliminating air filter.

Claim 12 should read as follows:

Claim 12: An exhaust particle and particulate containment system for a coffee roaster, comprising:
an exhaust duct for carrying exhaust coffee roasting by-products including air, gasses, smoke and chaff from said coffee roaster;
a porous medium for separating chaff from said exhaust coffee roasting by-products flowing through said duct; and
means, including chaff containment wall segments formed by said porous medium and at least a portion of a surface of said exhaust duct, for containing said chaff separated from said exhaust coffee roasting by-products; and
a filter for removing smoke particles from said exhaust coffee roasting by-products which pass through said porous medium.

UNITED STATES PATENT AND TRADEMARK OFFICE
CERTIFICATE OF CORRECTION

PATENT NO : 5,943,790
DATED : August 31, 1999
INVENTOR(S): Harold A. Gell, Jr.

It is certified that error appears in the above-identified patent and that said Letters Patent are hereby corrected as shown below:

Claim 15 should read as follows:

Claim 15: An exhaust particle and particulate containment system as defined by Claim 12, comprising:
a wall;
said wall including a gas impervious upper section and a porous lower section;
a gas impervious means connecting said wall to said duct for forming a chamber comprising said wall and an exterior surface of said duct;
said porous medium arranged between said wall and said duct to divide said chamber into an upper chamber incorporating said gas impervious upper section of said wall and a lower chamber incorporating said lower porous section of said wall;
said upper chamber including a bottom formed by said porous medium and a top extending above an upper portion of said duct including said outlet end;
a gas impervious cover enclosing said top of said upper chamber for creating a flow path for said exhaust coffee roasting by-products from said duct into said upper chamber, through said porous medium and into said lower chamber; and
a filter media with a porosity which will not allow passage of smoke particles created from coffee bean elements dimensiond and positioned in said lower chamber to cover said porous lower section of said wall and create a secondary lower chamber for dispersing said exhaust coffee roasting by-products over a surface of said filter media

UNITED STATES PATENT AND TRADEMARK OFFICE
CERTIFICATE OF CORRECTION

PATENT : 5,943,790

DATED : August 31, 1999

INVENTOR(S) : Harold A. Gell, Jr.

It is certified that error appears in the above-identified patent and that said Letters Patent is hereby corrected as shown below:

opposite said wall whereby said exhaust coffee roasting by-products are exhausted through said filter media and then said porous lower section of said wall.

Signed and Sealed this

Twelfth Day of December, 2000

Attest:

Q. TODD DICKINSON

*Attesting Officer*                    *Director of Patents and Trademarks*